3,350,228
ELECTROLYTE SOLUTION CONTAINING SOLUBLE RHENIUM COMPOUND
Joseph A. Shropshire, Westfield, N.J., assignor to Esso Research and Engineering Company, a corporation of Delaware
No Drawing. Filed Jan. 10, 1963, Ser. No. 250,495
6 Claims. (Cl. 136—86)

This invention relates to electrochemical conversion of chemical energy to electrical energy. In particular, this invention relates to a novel fuel cell and to a novel process for the operation of a fuel cell employing an electrolyte soluble catalyst. More particularly, this invention relates to the use of the element rhenium in soluble form in fuel cell electrolytes.

The term "fuel cell" is used herein and in the art to denote a device, system or apparatus wherein chemical energy of a combustible fuel is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes. Such electrodes function as an anode and cathode which are separated by an electrolyte which provides ionic conductance between said electrodes. The electrodes are in electrical communication by conduction means external to the electrolyte. The fuel cell is fitted with means for admitting a fluid fuel into contact with the anode and the electrolyte and a means for admitting an oxidant into contact with the cathode and the electrolyte. Where necessary or desired, the electrolyte compartment is divided into an anolyte compartment and a catholyte compartment by an ion-permeable partition or ion-exchange membrane. Thus, in each such cell a fuel is oxidized at the anode and an oxidant is reduced at the cathode upon receiving electrons from such anode. Fuel cells wherein the sole or primary fuel is anodically oxidized to produce compounds such as ketones and aldehydes are known in the art. This invention is also concerned with improvements in fuel cells employing a fluid organic fuel and an aqueous acid electrolyte to produce partially oxidized compounds, i.e., ketones and aldehydes.

Hydrogen, carbon monoxide, hydrocarbons, oxygenated hydrocarbons are fuels that are sources of chemical energy for fuel cell oxidation. For instance, U.S. Patent 2,384,463, issued to R. Gunn et al., discloses gaseous fuels including hydrogen, carbon monoxide, methane, ethane, propane, butane, isobutane, water gas, producer gas, illuminating gas, natural gas and liquid fuels including petroleum, the many derivatives and products thereof, the broad class of hydrocarbons and the oxygenated derivatives thereof such as alcohols. In another example of the prior art, U.S. Patent 2,925,454, issued to E. Justi et al., there is suggested as fuels liquid organic compounds such as alcohols, ketones, ethers, paraffins and aromatic hydrocarbons having not more than 14 carbon atoms per molecule.

This invention may be advantageously practiced with any fluid organic compound suitable for use in conventional fuel cells employing an aqueous electrolyte.

When an organic fuel is employed as the primary fuel, the efficiency of the fuel cell is enhanced by achieving an electrochemical reaction wherein the oxidation proceeds rapidly to completion, yielding carbon dioxide and water with a release of electrons to the anode. Efficiency of operation for the generation of power is therefore enhanced by minimizing the formulation of intermedaite oxidation products, which under the conditions of oxidation, may prove to be more resistive to oxidation than is the original feed stock. Heretofore, in cells operating at relatively low temperatures; e.g., 50 to 350° F., efforts to increase the efficiency of electrochemical oxidation have concentrated upon improvements in catalytic electrodes. If a catalyst is to remain fixed in position upon an electrode surface, it must be insoluble in the electrolyte which it contacts. In cells employing a strong acid electrolyte, e.g., aqueous $H_2SO_4$, this has meant the use of noble metal catalysts.

It has now been discovered that the efficiency of a power generating fuel cell employing an aqueous electrolyte is surprisingly improved by the presence of rhenium in such electrolyte. The advantages obtained by employing rhenium in the anolyte are particularly applicable to the generation of electrical energy from an organic fuel and are manifested by increases in maximum current density at a given voltage and increased selectivity to carbon dioxide.

The ions of rhenium can be added to the electrolyte either directly by dissolving therein a rhenium comprising compound that is soluble in such electrolyte or a separate solution may be prepared and the ion admitted to the electrolyte via either the fuel or oxidant inlet means, depending upon the construction of the cell employed, the fuel, the electrolyte, etc. Rhenium exhibits at least seven states of oxidation in its compounds. In a preferred embodiment of this invention the rhenium is introduced into the electrolyte by dissolving in the electrolyte a rhenium salt of a strong acid or a rhenium oxide. The most commonly used electrolytes are sodium hydroxide, potassium hydroxide and sulfuric acid. It is preferred to introduce the rhenium in the form of the oxide in either the basic or acidic electrolytes. Other rhenium compounds which may be used to furnish the rhenium in this invention are rhenium compounds such as the halides and oxyhalides. The metal rhenium may also be used when sulfuric acid is employed as the electrolyte.

The rhenium is preferably employed in low concentrations in the electrolyte; i.e., about 0.0001 to about 5 wt. percent, preferably about 0.01 to 1 wt. percent.

The rhenium may be used in a cell employing a common or undivided electrolyte, i.e., without physical separation between the anode and cathode, or it may be added to the anolyte and/or anolyte and catholyte of a cell wherein the electrolyte is divided into an anolyte and a catholyte compartment by an ion-permeable or ion-exchange partition.

The aqueous electrolytes that may be used in the practice of this invention are strong bases such as KOH, NaOH, LiOH, aqueous solutions of strong acids such as $H_2SO_4$, $H_3PO_4$, HCl, $HNO_3$ or peracetic acid and with aqueous carbonate electrolytes; e.g., $K_2CO_3$-$KHCO_3$ and $Na_2CO_3$-$NaHCO_3$. In the case of the basic electrolytes, it is sometimes necessary to continuously circulate the electrolyte in order to remove the carbon dioxide formed during the oxidation of the organic fuel. The basic electrolyte may be circulated from the cell, the carbon dioxide removed and the electrolyte is then returned to the cell. The circulation may be continuous or intermittent.

Example 1

The invention will be more easily understood from the following examples which are for the purpose of illustration only and should not be construed as a limitation upon the true scope of the invention as set forth in the claims.

Example 1

The effect of adding a soluble rhenium compound to the anolyte of a fuel cell was tested. One wt. percent of rhenium heptoxide was added to a cell of the aforesaid type using a 30 wt. percent sulfuric acid electrolyte and formaldehyde as the organic fuel. The electrolyte temperature employed was about 80° C. The anode employed was a platinum screen having platinum black deposited thereon. A similar cell with the exception that the electrolyte contained no rhenium, was run so as to determine the effect of the rhenium on the oxidation of an organic fuel. The results obtained are set forth in the following table:

| System | Polarization from Standard Hydrogen Electrode at Indicated ma./cm.$^2$ | | | | |
|---|---|---|---|---|---|
| | 0 | 1 | 10 | 50 | 100 |
| Pt. black on Pt. 30 wt. percent $H_2SO_4$ 1 wt. percent $Re_2O_7$ 1M HCHO | 0.18 | 0.23 | 0.30 | 0.42 | 0.49 |
| Pt. black on Pt. 30 wt. percent $H_2SO_4$ 1M HCHO | 0.18 | 0.50 | 0.59 | 0.65 | 0.70 |

It is apparent from the results that the rhenium gives an improvement of better than 0.2 volt at all current densities.

Example 2

The effect of adding a soluble rhenium compound to the anolyte of a fuel cell was tested. One tenth (0.1) wt. percent $Re_2O_7$ was added to a cell of the aforesaid type using a 30 wt. percent sulfuric acid electrolyte and methanol as the organic fuel. The electrolyte temperature employed was about 82° C. The anode employed was a platinum screen having a platinum black deposited thereon. A similar cell with the exception that the electrolyte contained no rhenium, was run so as to determine the effect of the rhenium on the oxidation of an organic fuel. The results obtained are set forth in the following table:

| System | Polarization from Standard Hydrogen Electrode at Indicated ma./cm.$^2$ | | | |
|---|---|---|---|---|
| | 1 | 10 | 50 | 100 |
| Pt. black on Pt. 30 wt. percent $H_2SO_4$ 0.1 wt. percent $Re_2O_7$ 1M $CH_3OH$ | 0.30 | 0.38 | 0.45 | 0.48 |
| Pt. black on Pt. 30 wt. percent $H_2SO_4$ 1M $CH_3OH$ | 0.46 | 0.52 | 0.57 | 0.60 |

What is claimed is:

1. In a fuel cell comprising inert electrodes immersed in an aqueous electrolyte, the improvement in combination therewith wherein said aqueous electrolyte contains an additive consisting of about 0.0001 to about 5 weight percent, based upon the weight of said electrolyte, of a soluble rhenium compound.
2. A fuel cell as defined by claim 1 wherein said compound is a rhenium salt of a strong acid.
3. A fuel cell as defined by claim 1 wherein said compound is a rhenium oxide.
4. A fuel cell as defined by claim 1 wherein said compound is rhenium heptoxide.
5. A fuel cell as defined by claim 1 wherein said electrolyte is aqueous sulfuric acid.
6. In the method of operating a fuel cell employing an aqueous electrolyte and a fluid organic fuel the improvement in combination therewith comprising adding about 0.0001 to 5 wt. percent of a soluble rhenium compound to said electrolyte and contacting the resulting electrolyte with an anode and said fuel.

References Cited

UNITED STATES PATENTS

| | | | |
|---|---|---|---|
| 3,000,996 | 9/1961 | Usel | 136—9 |
| 3,134,697 | 5/1964 | Niedrach | 136—86 |
| 3,178,315 | 4/1965 | Worsham | 136—86 |
| 3,245,890 | 4/1966 | Klass | 136—86 |

WINSTON A. DOUGLAS, *Primary Examiner.*

A. SKAPARS, *Assistant Examiner.*